United States Patent
Lin et al.

(10) Patent No.: US 8,832,635 B2
(45) Date of Patent: Sep. 9, 2014

(54) SIMULATION OF CIRCUITS WITH REPETITIVE ELEMENTS

(71) Applicant: Mentor Graphics Corporation, Wilsonville, OR (US)

(72) Inventors: Pole Shang Lin, Fremont, CA (US); Kuei Shan Wen, Fremont, CA (US); Ruey Kuen Perng, Zhubei (TW)

(73) Assignee: Mentor Graphics Corporation, Wilsonville, OR (US)

( * ) Notice: Subject to any disclaimer, the term of this patent is extended or adjusted under 35 U.S.C. 154(b) by 0 days.

(21) Appl. No.: 13/709,499

(22) Filed: Dec. 10, 2012

(65) Prior Publication Data

US 2013/0191805 A1    Jul. 25, 2013

Related U.S. Application Data

(60) Provisional application No. 61/583,727, filed on Jan. 6, 2012.

(51) Int. Cl.
*G06F 17/50* (2006.01)

(52) U.S. Cl.
CPC ........ *G06F 17/5009* (2013.01); *G06F 2217/04* (2013.01); *G06F 17/5036* (2013.01)
USPC ............ 716/136; 716/106; 716/111; 716/125

(58) Field of Classification Search
USPC ................................. 716/106, 111, 125, 136
See application file for complete search history.

(56) References Cited

U.S. PATENT DOCUMENTS

| | | | | |
|---|---|---|---|---|
| 5,761,664 A | * | 6/1998 | Sayah et al. | 1/1 |
| 5,764,951 A | * | 6/1998 | Ly et al. | 716/103 |
| 5,805,860 A | * | 9/1998 | Parham | 716/101 |
| 5,867,397 A | * | 2/1999 | Koza et al. | 703/14 |
| 5,909,376 A | * | 6/1999 | Scepanovic et al. | 716/123 |
| 5,991,521 A | * | 11/1999 | Gabele et al. | 716/112 |
| 6,031,979 A | * | 2/2000 | Hachiya | 716/106 |
| 6,112,022 A | * | 8/2000 | Wei | 703/14 |
| 6,134,513 A | * | 10/2000 | Gopal | 703/14 |
| 6,134,702 A | * | 10/2000 | Scepanovic et al. | 716/122 |
| 6,295,627 B1 | * | 9/2001 | Gowni et al. | 716/104 |
| 6,577,992 B1 | | 6/2003 | Tcherniaev et al. | |
| 2006/0161413 A1 | * | 7/2006 | Wei et al. | 703/14 |

OTHER PUBLICATIONS

"A Perspective on Fast-SPICE Simulation Technology" Michael Rewienski, P. Li et al. (eds.), Simulation and Verification of Electronic and Biological Systems, DOI 10.1007/978-94-007-0149-6_2 Springer Science + Business Media B.V. (2011).

* cited by examiner

*Primary Examiner* — Sun Lin

(57) ABSTRACT

Aspects of the invention relate to simulation of circuits with repetitive elements. With various implementations of the invention, a circuit design for simulation is analyzed to derive information of memory-circuit device groups that comprise word-line-driven device groups. If the circuit design is hierarchically structured, the circuit design is flattened to device level but keep the memory-circuit device groups intact. The circuit design is then partitioned into a plurality of subcircuits for a simulation. During a transient simulation, whether an instance of a word-line-driven device group is activated is first determined. If activated, whether device model values exist for the word-line-driven device group at a voltage state associated with the activated instance is then determined. If they exist, the device model values are associated with the activated instance. If they do not exist, the device model values are computed for, stored for and associated with the activated instance.

20 Claims, 7 Drawing Sheets

SIMULATION OF CIRCUITS WITH REPETITIVE ELEMENTS

RELATED APPLICATIONS

This application claims priority to U.S. Provisional Patent Application No. 61/583,727, entitled "Simulation Methods For Cell Arrays," filed on Jan. 6, 2012, and naming Pole Shang Lin et al. as inventors, which application is incorporated entirely herein by reference.

FIELD OF THE INVENTION

The present invention is directed to computer-aided circuit design tools. Various aspects of the invention may be particularly useful for improving simulation of circuits with repetitive elements such as memory cells.

BACKGROUND OF THE INVENTION

Transistor-level circuit simulation is important for designing integrated circuits. Simulating a circuit's behavior before actually building it can greatly improve design efficiency by making faulty designs known and providing insight into the behavior of electronics circuit designs. A circuit simulator formulates circuit equations and then numerically solves them to compute the circuit response to a particular stimulus. Developed about forty years ago, SPICE (Simulation Program with Integrated Circuit Emphasis) simulators are still being widely used in part due to its precision.

While offering superior precision, SPICE simulators are limited to the simulation of small subcircuit blocks because of their memory capacity requirements and performance limitations. During simulation, device connectivity and parameters are stored for each device. As a result, the memory usage is approximately proportional to the circuit size measured in number of devices in the circuit. Assuming 500 bytes of memory per device, about 50 Gigabytes (50 billion bytes) of memory are required to simulate a circuit containing 100 million devices. The circuit size also presents another challenge, namely simulation time, to conventional transistor-level simulators. As noted above, the circuit behavior is formulated into mathematical equations to be solved during simulation. The computations increase with the number of devices in the circuit. For a circuit with tens of millions of devices, tens of millions of equations may be required. The excessive memory usage and computation time required make it impractical to use conventional transistor-level simulators for full-chip simulation on today's integrated circuits.

The Fast-SPICE simulators have been developed to address these limitations. One of the main approaches adopted by the Fast-SPICE simulators is breaking a circuit into smaller subcircuits and solving each subcircuit independently. Further, if the signals in one or more subcircuits are latent during an interval of time, then it is not necessary to solve for them during that interval of time. Many integrated circuits have repetitive elements such as memory cells. Only a small number of these cells are activated at a time. Computation time and memory consumed for simulating these circuits could be significantly reduced by taking advantage of these properties.

BRIEF SUMMARY OF THE INVENTION

Aspects of the invention relate to simulation of circuits with repetitive elements. In various embodiments of the invention, a circuit design for simulation is analyzed to derive information of memory-circuit device groups. Each of the memory-circuit device groups has at least two instances in the circuit design. The memory-circuit device groups comprise word-line-driven device groups such as groups of memory cells ((DRAM, SRAM, FLASH, CAM, ROM etc.). A word-line-driven group is a memory-circuit device group of which input ports can be used to turn off its bi-directional ports. The memory-circuit device groups may also comprise memory-circuit device groups that are not word-line-driven such as groups of sense amplifiers.

If the circuit design is hierarchically structured, the circuit design is flattened to the device level (transistor level) except for the memory-circuit device groups, which are kept intact. The circuit design is then partitioned into a plurality of sub-circuits. Port information for devices and device groups may be used for the partitioning.

At the starting time t=0, all memory-circuit device groups may share the same voltage state. The calculation of device model values may be performed once for all memory-circuit device groups. The device model values calculated for word-line-driven device groups may be used later as inactivated device model values.

During transient simulation, whether an instance of a word-line-driven device group is activated is determined. The instance is activated if at least one input port of the instance is activated. If inactivated, the inactivated device model values for the word-line-driven device group is associated with the inactivated instance. If activated, whether device model values exist for the word-line-driven device group at a voltage state associated with the activated instance is then determined. If they exist, the device model values are associated with the activated instance. If they do not exist, the device model values are computed for, stored for and associated with the activated instance.

If the word-line-driven device group includes another word-line-driven device group (child word-line-driven device group), during the computation of device model values, whether one or more activated input ports of the activated instance of the word-line-driven device group are coupled to one or more input ports of an instance of the child word-line-driven device group may be determined. If coupled, the above process may be performed to derive device model values for the instance of the child word-line-driven device group.

DETAILED DESCRIPTION OF THE INVENTION

Figure 1:
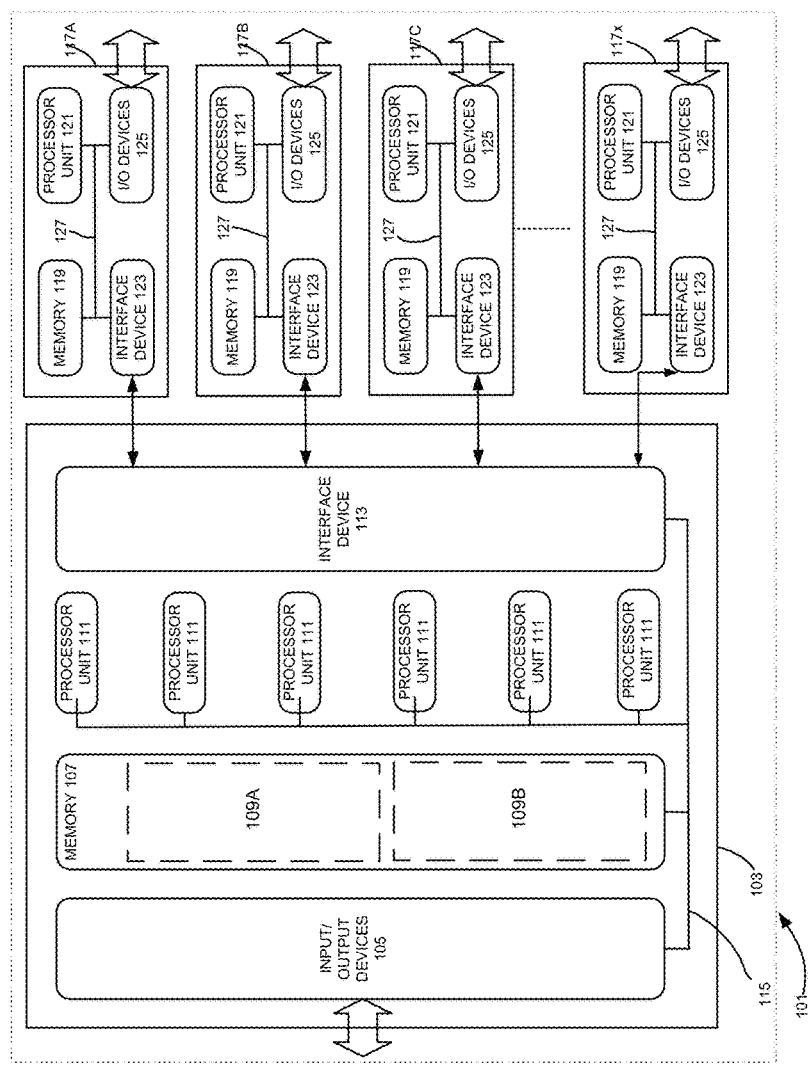
FIG. 1 illustrates an example of a computing system that may be used to implement various embodiments of the invention.

Various aspects of the present invention relate to simulating circuits with repetitive elements. In the following description, numerous details are set forth for purpose of explanation. However, one of ordinary skill in the art will realize that the invention may be practiced without the use of these specific details. In other instances, well-known features have not been described in details to avoid obscuring the present invention.

Although the operations of some of the disclosed methods, apparatus, and systems are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods, apparatus, and systems can be used in conjunction with other methods, apparatus, and systems. Additionally, the description sometimes uses terms like "determine," "analyze" and "associate" to describe the disclosed methods. These terms are high-level abstractions of the actual operations that are performed. The actual operations that correspond to these terms may vary depending on the particular implementation and are readily discernible by one of ordinary skill in the art.

Any of the disclosed techniques can be implemented in whole or in part by software comprising computer-executable instructions stored on computer-readable media. Such software can comprise, for example, an appropriate electronic design automation ("EDA") software tool (e.g., an automatic test pattern generation ("ATPG") tool). Such software can be executed on a single computer or on a networked computer (e.g., via the Internet, a wide-area network, a local-area network, a client-server network, or other such network). For clarity, only certain selected aspects of the software-based implementations are described. Other details that are well known in the art are omitted. For example, it should be understood that the disclosed technology is not limited to any specific computer language, program, or computer. For example, the disclosed technology can be implemented using any commercially available computer executing a program written in any commercially available or otherwise suitable language. Any of the disclosed methods can alternatively be implemented (partially or completely) in hardware (e.g., an ASIC, PLD, or SoC).

Any data produced from any of the disclosed methods (e.g., intermediate or final test patterns, test patterns values, or control data) can be stored on computer-readable media (e.g., tangible computer-readable media, such as one or more CDs, volatile memory components (such as DRAM or SRAM), or nonvolatile memory components (such as hard drives)) using a variety of different data structures or formats. Such data can be created, updated, or stored using a local computer or over a network (e.g., by a server computer).

As used in this disclosure, the singular forms "a," "an," and "the" include the plural forms unless the context clearly dictates otherwise. Additionally, the term "includes" means "comprises." Moreover, unless the context dictates otherwise, the term "coupled" means electrically or electromagnetically connected or linked and includes both direct connections or direct links and indirect connections or indirect links through one or more intermediate elements not affecting the intended operation of the circuit. Furthermore, the term "design" is intended to encompass data describing an entire microdevice, such as an integrated circuit device or micro-electromechanical system (MEMS) device. This term also is intended to encompass a smaller group of data describing one or more components of an entire microdevice, however, such as a layer of an integrated circuit device, or even a portion of a layer of an integrated circuit device. Still further, the term "design" also is intended to encompass data describing more than one microdevice, such as data to be used to create a mask or reticle for simultaneously forming multiple microdevices on a single wafer. The layout design data may be in any desired format, such as, for example, the Graphic Data System II (GDSII) data format or the Open Artwork System Interchange Standard (OASIS) data format proposed by Semiconductor Equipment and Materials International (SEMI). Other formats include an open source format named Open Access, Milkyway by Synopsys, Inc., and EDDM by Mentor Graphics, Inc.

In this disclosure, the terms "subcircuit" and "memory-circuit device groups" are used in a broad sense.

Exemplary Operating Environment

The execution of various electronic design automation processes according to embodiments of the invention may be implemented using computer-executable software instructions executed by one or more programmable computing devices. Because these embodiments of the invention may be implemented using software instructions, the components and operation of a generic programmable computer system on which various embodiments of the invention may be employed will first be described. Further, because of the complexity of some electronic design automation processes and the large size of many circuit designs, various electronic design automation tools are configured to operate on a computing system capable of simultaneously running multiple processing threads. The components and operation of a computer network having a host or master computer and one or more remote or servant computers therefore will be described with reference to FIG. 1. This operating environment is only one example of a suitable operating environment, however, and is not intended to suggest any limitation as to the scope of use or functionality of the invention.

In FIG. 1, the computer network 101 includes a master computer 103. In the illustrated example, the master computer 103 is a multi-processor computer that includes a plurality of input and output devices 105 and a memory 107. The input and output devices 105 may include any device for receiving input data from or providing output data to a user. The input devices may include, for example, a keyboard, microphone, scanner or pointing device for receiving input from a user. The output devices may then include a display monitor, speaker, printer or tactile feedback device. These devices and their connections are well known in the art, and thus will not be discussed at length here.

The memory 107 may similarly be implemented using any combination of computer readable media that can be accessed by the master computer 103. The computer readable media may include, for example, microcircuit memory devices such as read-write memory (RAM), read-only memory (ROM), electronically erasable and programmable read-only memory (EEPROM) or flash memory microcircuit devices, CD-ROM disks, digital video disks (DVD), or other optical storage devices. The computer readable media may also include magnetic cassettes, magnetic tapes, magnetic disks or other magnetic storage devices, punched media, holographic storage devices, or any other medium that can be used to store desired information.

As will be discussed in detail below, the master computer 103 runs a software application for performing one or more operations according to various examples of the invention. Accordingly, the memory 107 stores software instructions 109A that, when executed, will implement a software application for performing one or more operations. The memory 107 also stores data 109B to be used with the software application. In the illustrated embodiment, the data 109B contains process data that the software application uses to perform the operations, at least some of which may be parallel.

The master computer 103 also includes a plurality of processor units 111 and an interface device 113. The processor units 111 may be any type of processor device that can be programmed to execute the software instructions 109A, but will conventionally be a microprocessor device. For example, one or more of the processor units 111 may be a commercially generic programmable microprocessor, such as Intel® Pentium® or Xeon™ microprocessors, Advanced Micro Devices Athlon™ microprocessors or Motorola 68K/Coldfire® microprocessors. Alternately or additionally, one or more of the processor units 111 may be a custom-manufactured processor, such as a microprocessor designed to optimally perform specific types of mathematical operations. The interface device 113, the processor units 111, the memory 107 and the input/output devices 105 are connected together by a bus 115.

Figure 2:
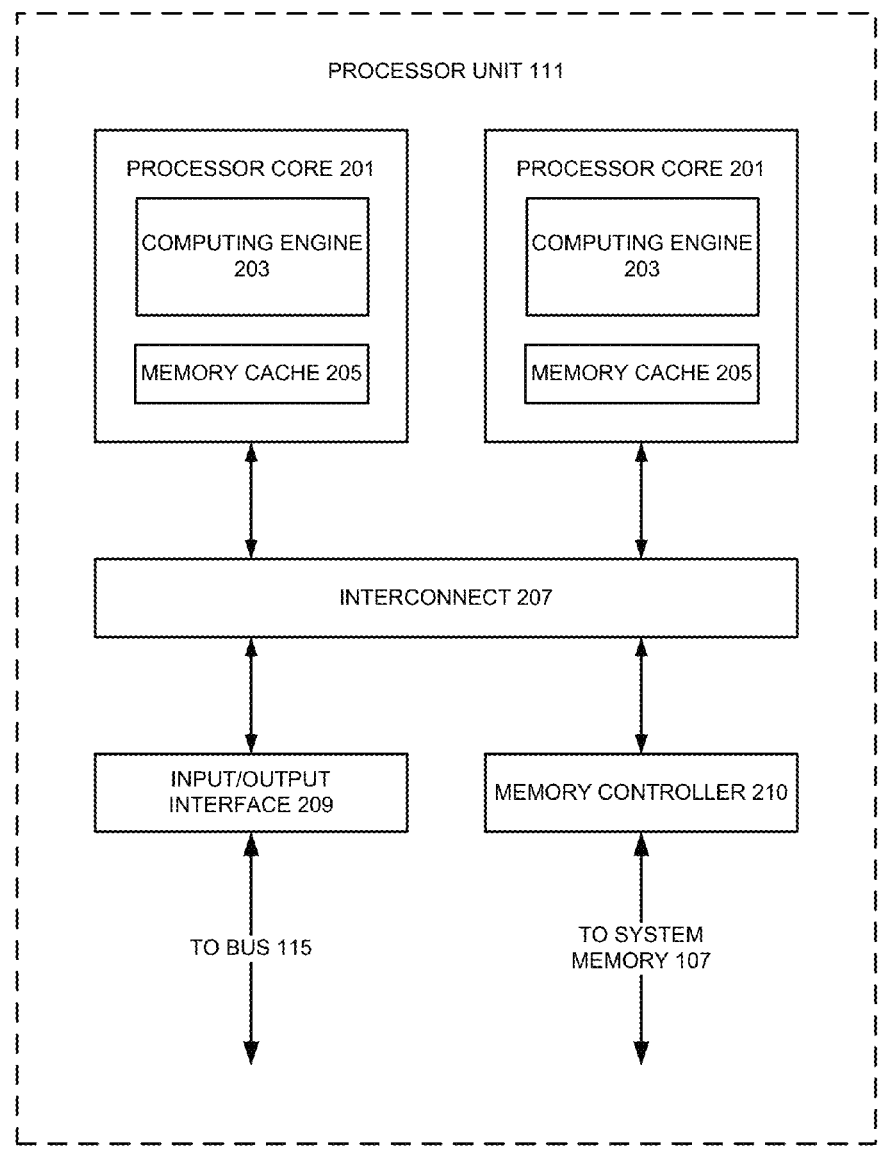
FIG. 2 illustrates an example of a multi-core processor unit that may be used to implement various embodiments of the invention.

With some implementations of the invention, the master computing device 103 may employ one or more processing units 111 having more than one processor core. Accordingly, FIG. 2 illustrates an example of a multi-core processor unit 111 that may be employed with various embodiments of the invention. As seen in this figure, the processor unit 111 includes a plurality of processor cores 201. Each processor core 201 includes a computing engine 203 and a memory cache 205. As known to those of ordinary skill in the art, a computing engine contains logic devices for performing various computing functions, such as fetching software instructions and then performing the actions specified in the fetched instructions. These actions may include, for example, adding, subtracting, multiplying, and comparing numbers, performing logical operations such as AND, OR, NOR and XOR, and retrieving data. Each computing engine 203 may then use its corresponding memory cache 205 to quickly store and retrieve data and/or instructions for execution.

Each processor core 201 is connected to an interconnect 207. The particular construction of the interconnect 207 may vary depending upon the architecture of the processor unit 111. With some processor cores 201, such as the Cell microprocessor created by Sony Corporation, Toshiba Corporation and IBM Corporation, the interconnect 207 may be implemented as an interconnect bus. With other processor units 111, however, such as the Opteron™ and Athlon™ dual-core processors available from Advanced Micro Devices of Sunnyvale, Calif., the interconnect 207 may be implemented as a system request interface device. In any case, the processor cores 201 communicate through the interconnect 207 with an input/output interface 209 and a memory controller 210. The input/output interface 209 provides a communication interface between the processor unit 111 and the bus 115. Similarly, the memory controller 210 controls the exchange of information between the processor unit 111 and the system memory 107. With some implementations of the invention, the processor units 111 may include additional components, such as a high-level cache memory accessible shared by the processor cores 201.

While FIG. 2 shows one illustration of a processor unit 111 that may be employed by some embodiments of the invention, it should be appreciated that this illustration is representative only, and is not intended to be limiting. For example, some embodiments of the invention may employ a master computer 103 with one or more Cell processors. The Cell processor employs multiple input/output interfaces 209 and multiple memory controllers 210. Also, the Cell processor has nine different processor cores 201 of different types. More particularly, it has six or more synergistic processor elements (SPEs) and a power processor element (PPE). Each synergistic processor element has a vector-type computing engine 203 with 428×428 bit registers, four single-precision floating point computational units, four integer computational units, and a 556 KB local store memory that stores both instructions and data. The power processor element then controls that tasks performed by the synergistic processor elements. Because of its configuration, the Cell processor can perform some mathematical operations, such as the calculation of fast Fourier transforms (FFTs), at substantially higher speeds than many conventional processors.

It also should be appreciated that, with some implementations, a multi-core processor unit 111 can be used in lieu of multiple, separate processor units 111. For example, rather than employing six separate processor units 111, an alternate implementation of the invention may employ a single processor unit 111 having six cores, two multi-core processor units each having three cores, a multi-core processor unit 111 with four cores together with two separate single-core processor units 111, etc.

Returning now to FIG. 1, the interface device 113 allows the master computer 103 to communicate with the servant computers 117A, 117B, 117C . . . 117x through a communication interface. The communication interface may be any suitable type of interface including, for example, a conventional wired network connection or an optically transmissive wired network connection. The communication interface may also be a wireless connection, such as a wireless optical connection, a radio frequency connection, an infrared connection, or even an acoustic connection. The interface device 113 translates data and control signals from the master computer 103 and each of the servant computers 117 into network messages according to one or more communication protocols, such as the transmission control protocol (TCP), the user datagram protocol (UDP), and the Internet protocol (IP). These and other conventional communication protocols are well known in the art, and thus will not be discussed here in more detail.

Each servant computer 117 may include a memory 119, a processor unit 121, an interface device 123, and, optionally, one more input/output devices 125 connected together by a system bus 127. As with the master computer 103, the optional input/output devices 125 for the servant computers 117 may include any conventional input or output devices, such as keyboards, pointing devices, microphones, display monitors, speakers, and printers. Similarly, the processor units 121 may be any type of conventional or custom-manufactured programmable processor device. For example, one or more of the processor units 121 may be commercially generic programmable microprocessors, such as Intel® Pentium® or Xeon™ microprocessors, Advanced Micro Devices Athlon™ microprocessors or Motorola 68K/Coldfire® microprocessors. Alternately, one or more of the processor units 121 may be custom-manufactured processors, such as microprocessors designed to optimally perform specific types of mathematical operations. Still further, one or more of the processor units 121 may have more than one core, as described with reference to FIG. 2 above. For example, with some implementations of the invention, one or more of the processor units 121 may be a Cell processor. The memory 119 then may be implemented using any combination of the computer readable media discussed above. Like the interface device 113, the interface devices 123 allow the servant computers 117 to communicate with the master computer 103 over the communication interface.

In the illustrated example, the master computer 103 is a multi-processor unit computer with multiple processor units 111, while each servant computer 117 has a single processor unit 121. It should be noted, however, that alternate implementations of the invention may employ a master computer having single processor unit 111. Further, one or more of the servant computers 117 may have multiple processor units 121, depending upon their intended use, as previously discussed. Also, while only a single interface device 113 or 123 is illustrated for both the master computer 103 and the servant computers, it should be noted that, with alternate embodiments of the invention, either the computer 103, one or more of the servant computers 117, or some combination of both may use two or more different interface devices 113 or 123 for communicating over multiple communication interfaces.

With various examples of the invention, the master computer 103 may be connected to one or more external data storage devices. These external data storage devices may be implemented using any combination of computer readable media that can be accessed by the master computer 103. The computer readable media may include, for example, microcircuit memory devices such as read-write memory (RAM), read-only memory (ROM), electronically erasable and programmable read-only memory (EEPROM) or flash memory microcircuit devices, CD-ROM disks, digital video disks (DVD), or other optical storage devices. The computer readable media may also include magnetic cassettes, magnetic tapes, magnetic disks or other magnetic storage devices, punched media, holographic storage devices, or any other medium that can be used to store desired information. According to some implementations of the invention, one or more of the servant computers 117 may alternately or additionally be connected to one or more external data storage devices. Typically, these external data storage devices will include data storage devices that also are connected to the master computer 103, but they also may be different from any data storage devices accessible by the master computer 103.

It also should be appreciated that the description of the computer network illustrated in FIG. 1 and FIG. 2 is provided as an example only, and it not intended to suggest any limitation as to the scope of use or functionality of alternate embodiments of the invention.

Memory Circuits, an Example of Circuits with Repetitive Elements

Memory circuits are encountered in virtually any chip. A memory circuit usually includes arrays of memory cells (DRAM, SRAM, FLASH, CAM etc.) ranging from hundreds of thousands cells to billions cells. For a typical two-dimensional array topology, the bandwidth of a matrix (circuit model) for the memory array is ($\sqrt{N}$), where N is the number of cells in the array. This implies the cost of computing a simple matrix-vector product is $O(N^{1.5})$, which can be prohibitively expensive for large N. Thus, efficient memory simulation is needed to achieve acceptable performance in full-chip simulations.

Typically, a large portion of a memory array remains latent because both read and write operations activate only a very small number of cells at any given time. Circuit simulators can thus exploit both the characteristic of repetitive cells and their operating pattern to accelerate the simulation and reduce the memory requirement.

Figure 3:
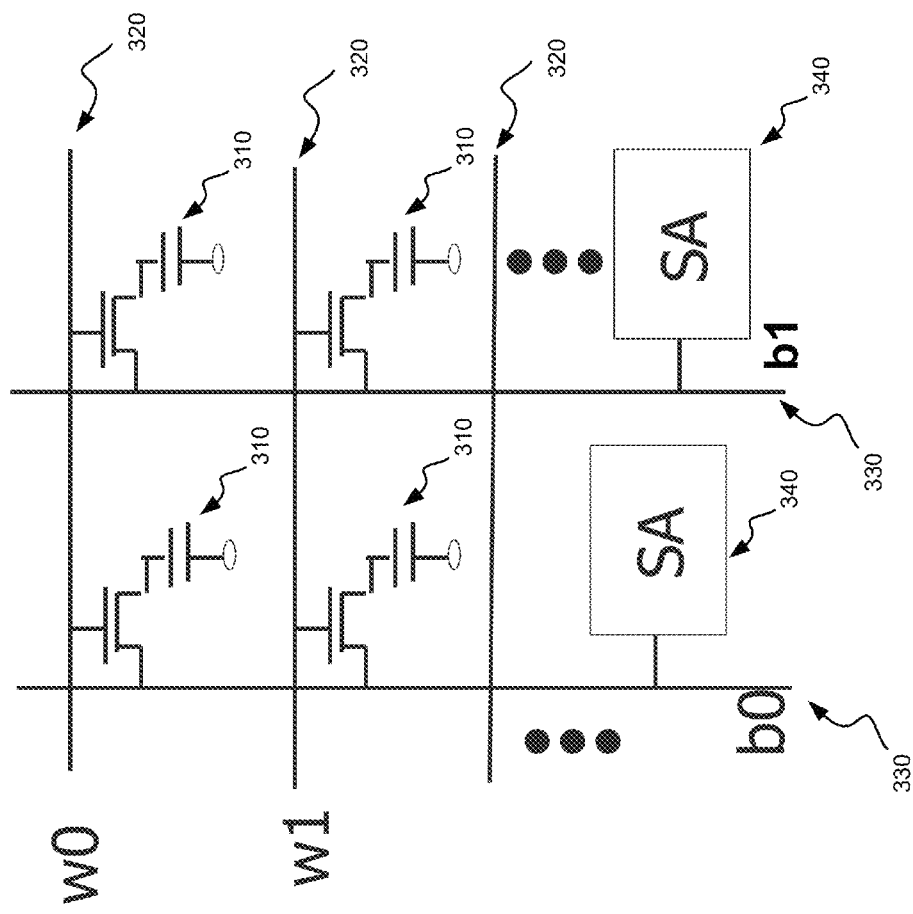
FIG. 3 illustrates an example of a portion of a memory cell array.

FIG. 3 illustrates an example of a portion of a cell memory array. The circuit shown includes a plurality of memory cells 310, word lines 320, bit lines 330, and sense amplifiers 340. If a word line is not activated, the memory cells coupled to the word line will remain latent. This property may be employed to identify latent memory cells during simulation. As will be appreciated by those of ordinary skill in the art, the disclosed technologies are applicable to various kinds of memory circuits such as DRAM, SRAM, FLASH, and CAM even though the DRAM cells are illustrated in FIG. 3.

Circuit Simulation Tool and Methods

Figure 4:
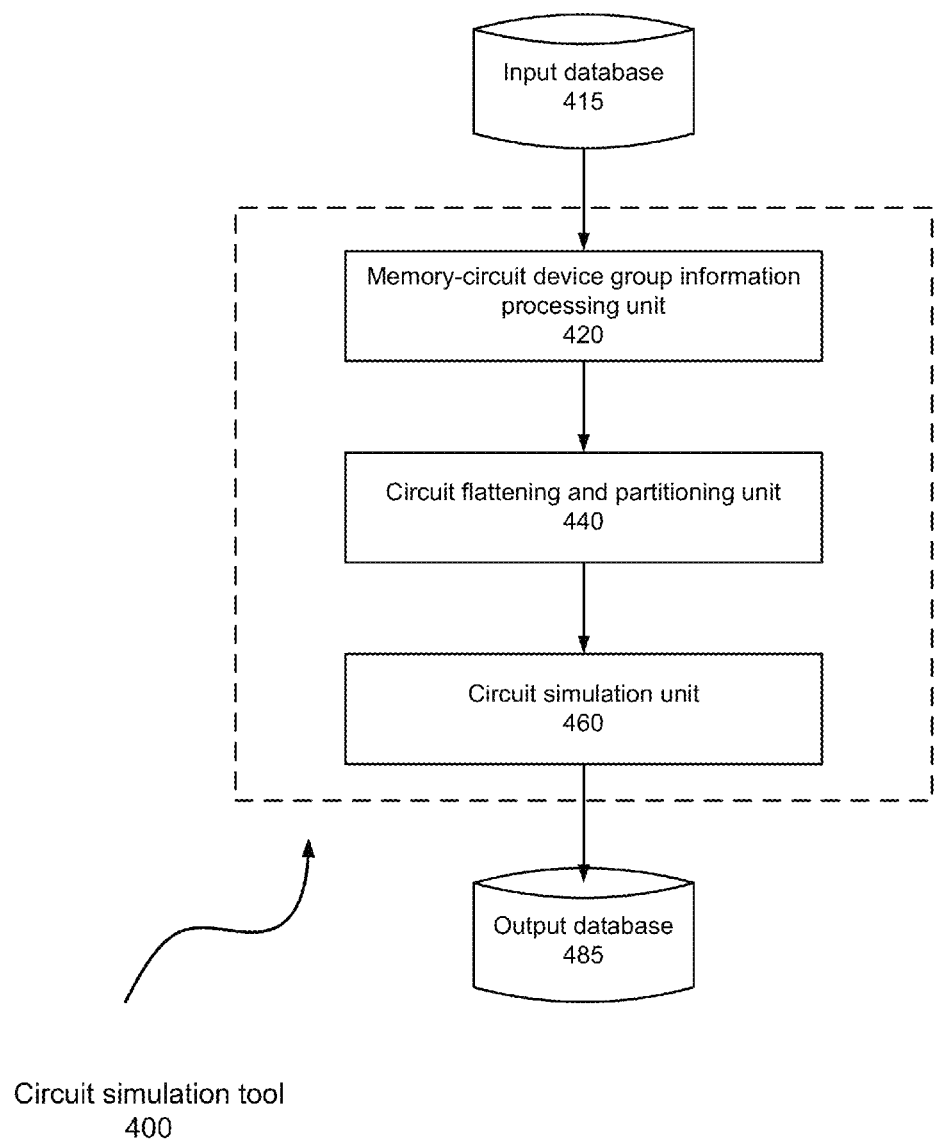
FIG. 4 illustrates an example of a tool for circuit simulation according to various embodiments of the invention.

FIG. 4 illustrates an example of a tool for circuit simulation according to various embodiments of the invention. As seen in the figure, the circuit simulation tool 400 may include three units: a memory-circuit device group information processing unit 420, a circuit flattening and partitioning unit 440, and a circuit simulation unit 460. As will be discussed in more detail below, some implementations of the circuit simulation tool 400 may cooperate with (or incorporated) either or both of an input database 415 and an output database 485.

According to some embodiments of the invention, one or some of the memory-circuit device group information processing unit 420, the circuit flattening and partitioning unit 440, and the circuit simulation unit 460 may be implemented by one or more computing systems, such as the computing system illustrated in FIGS. 1 and 2, executing programmable instructions. Correspondingly, some other embodiments of the invention may be implemented by software-executable instructions, stored on a non-transitory computer-readable medium, for instructing a computing system to perform functions of one or some of the memory-circuit device group information processing unit 420, the circuit flattening and partitioning unit 440, and the circuit simulation unit 460. As used herein, the term "non-transitory computer-readable medium" refers to computer-readable medium that are capable of storing data for future retrieval, and not propagating electro-magnetic waves. The non-transitory computer-readable medium may be, for example, a magnetic storage device, an optical storage device, a "punched" surface type device, or a solid state storage device. While the input database 415 and the output database 485 are shown as separate units in FIG. 4, a single computer-readable medium may be used to implement some or all of these databases.

Figure 5:
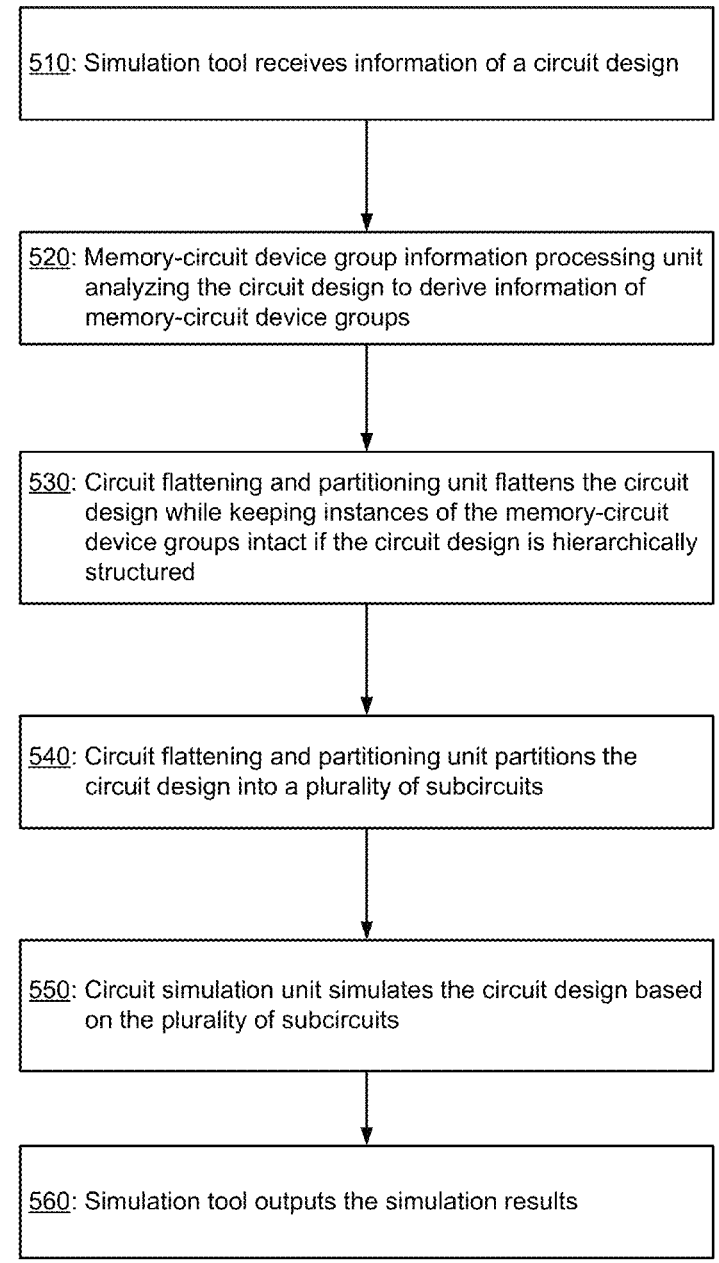
FIG. 5 illustrates a flow chart describing methods for circuit simulation that may be employed by various embodiments of the invention.

For ease of understanding, circuit simulation methods that may be employed according to various embodiments of the invention will be described with reference to the circuit simulation tool 400 in FIG. 4 and the flow chart 500 illustrated in FIG. 5. It should be appreciated, however, that alternate implementations of a circuit simulation tool may be used to perform the circuit simulation methods illustrated by the flow chart 500 according to various embodiments of the invention. Likewise, the circuit simulation tool 400 may be employed to perform other circuit simulation methods according to various embodiments of the invention.

Initially, in operation 510 of the flowchart 500, the circuit simulation tool 400 receives information of a circuit design. The circuit design may be described by a netlist. The netlist may have a hierarchical data structure.

Next, in operation 520, the memory-circuit device group information processing unit 420 analyzes the circuit design to derive information of memory-circuit device groups. A user of the circuit simulation tool 400 may provide definitions for the memory-circuit device groups. Each of the memory-circuit device groups has at least two instances in the circuit design. The memory-circuit device groups comprise word-line-driven device groups such as groups of memory cells 310 shown in FIG. 3. A memory-circuit device group is a word-line-driven device group if input ports of the word-line-driven device group can be used to turn off bi-directional ports of the word-line-driven device group. The classification of ports of a device or a memory-circuit device group into input ports and bi-directional ports will be discussed below. In addition to the word-line-driven device groups, the memory-circuit device groups may also comprise memory-circuit device groups that are not word-line-driven such as groups of sense amplifiers 340 shown in FIG. 3. Whether word-line driven or not, a memory-circuit device group may comprise instances of other memory-circuit device groups. The circuit simulation tool 400 treats a memory-circuit device group as a special device.

Like a native device (e.g., a transistor) in a transistor-level netlist, a memory-circuit device group has ports, with which it is coupled to other devices including memory-circuit device groups. The memory-circuit device group information processing unit 420 may classify ports for all devices into two groups: input ports and bi-directional ports. For a transistor, the gate terminal is an input port; the source and drain terminals are bi-directional ports. For a memory-circuit device group, a port is an input port if all ports of devices/memory-circuit device groups in the memory-circuit device group to which the port is coupled are input ports. The coupling may be through one or more resisters. A word-line-driven device group can have one or more word lines. Each of the one or more word lines is usually coupled to an input port of the word-line-driven device group. The memory-circuit device group information processing unit 420 may include the information of input ports and bi-directional ports for each of the memory-circuit device groups in the information of memory-circuit device groups. The information of input ports and bi-directional ports may be used for the subsequent circuit partition.

If the circuit design is hierarchically structured, in operation 530, the circuit flattening and partitioning unit 440 flattens the circuit design. With various implementations of the invention, the circuit design is flattened to the device level (transistor level) except for the memory-circuit device groups. That is, instances of the memory-circuit device groups are kept intact. The circuit flattening and partitioning unit 440 may adopt any conventional methods for flattening. It should be appreciated that while operations 520 and 530 are shown as separate operations in a particular sequence, they may be performed in parallel.

Next, in operation 540, the circuit flattening and partitioning unit 440 partitions the circuit design into a plurality of subcircuits. The partitioning may be performed using carefully designed physical and/or mathematical criteria. Various conventional techniques may be applied. In some embodiments of the invention, port information for devices and device groups may be used. For example, if a node is coupled only to input ports of device/device groups, the node may serve as a cut point for partitioning.

Once the circuit design is partitioned, in operation 550, the circuit simulation unit 460 simulates the circuit design based on the plurality of subcircuits. Instead of solving a single system of equations for the whole design, the circuit simulation unit 460 may calculate device model values separately for each subcircuit and simulate the behavior of the subcircuits based on the device model values. A device model may be in a form of a system of linear equations. The device model values are dependent upon device component parameters and the voltage state (node voltages). At the starting time t=0, all memory-circuit device groups may share the same voltage state. The calculation of device model values may be performed once for all memory-circuit device groups. The device model values calculated for word-line-driven device groups may be used later for inactivated word-line-driven device groups.

Figures 7A, 7B:
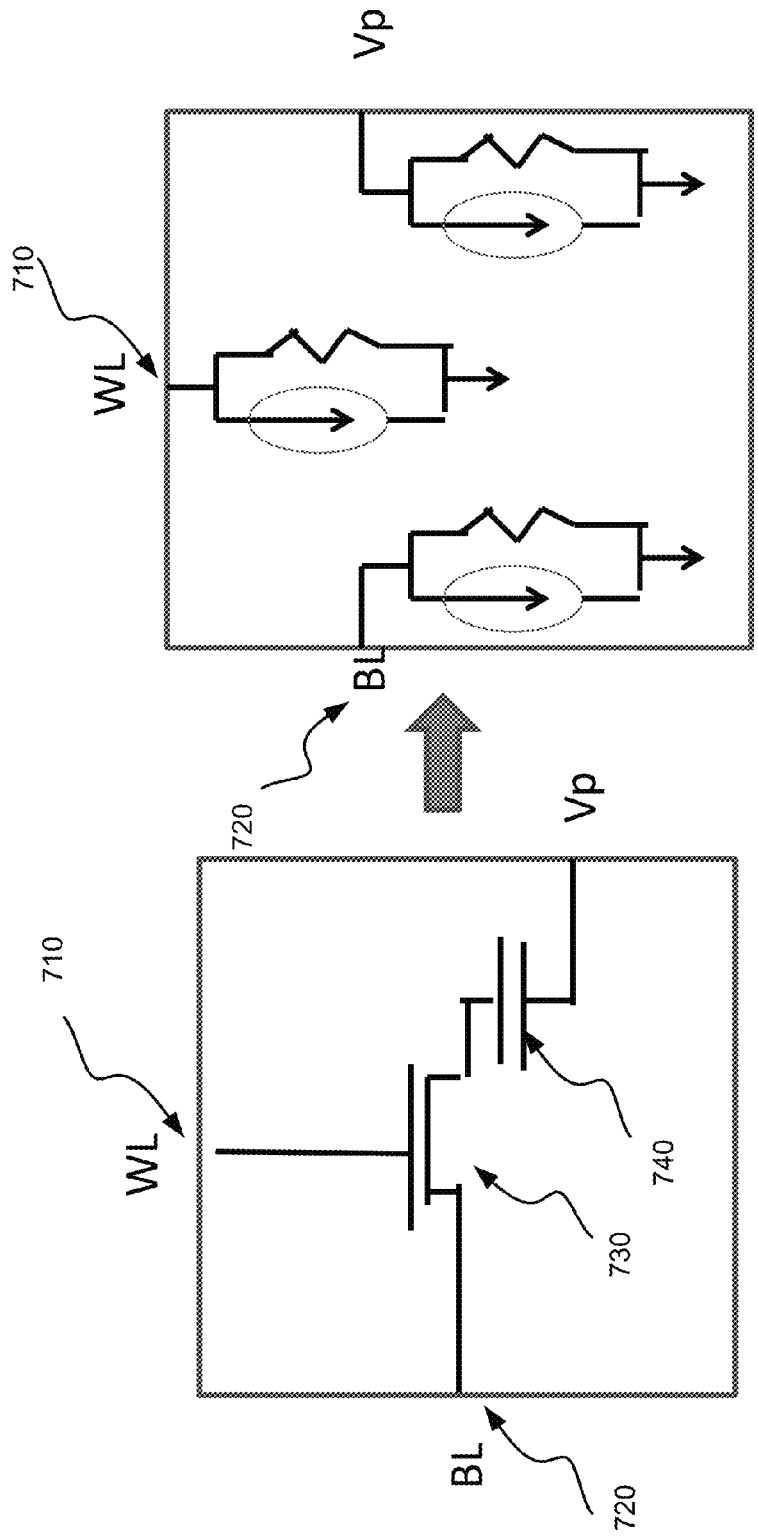
FIG. 7a illustrates an example of a memory cell (DRAM)
FIG. 7b illustrates an example of an equivalent circuit for the memory cell at an inactive state.

FIG. 7a illustrates an example of a memory cell (DRAM); FIG. 7b illustrates an example of an equivalent circuit for the memory cell at an inactive state. The memory cell contains a transistor 730 and a capacitor 740 and has a word line input port 710 and bit line port 720. As can be seen from the figure, the memory cell is simplified by a grounded Norton equivalent circuit. This simplification can speed up the simulation without sacrificing accuracy significantly. While the DRAM cell is used in the figure, the approach can be applied to other cells such as FLASH, ROM and SRAM.

Figure 6:
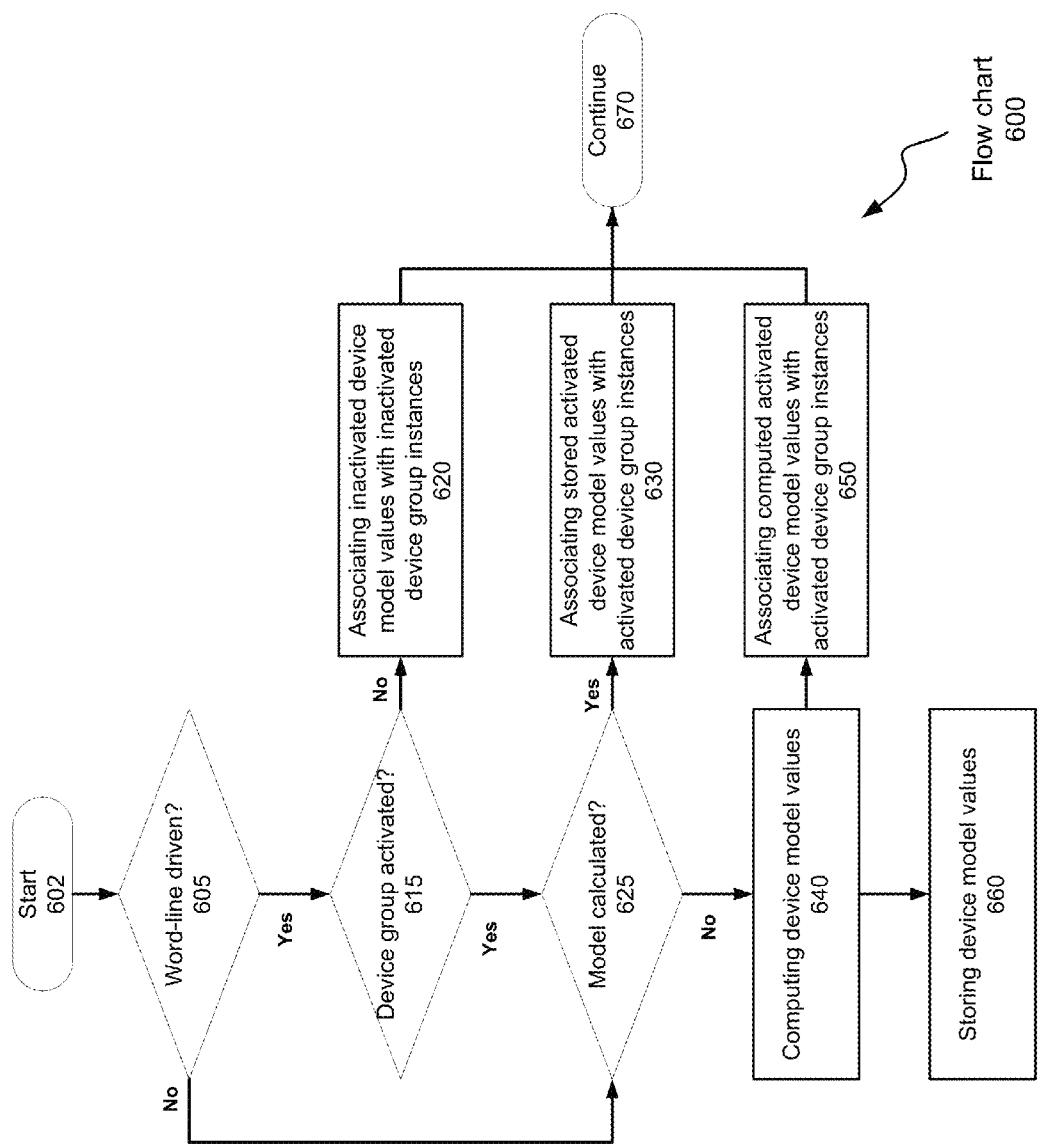
FIG. 6 illustrates a flow chart describing methods for deriving device model values for memory-circuit device groups that may be employed by various embodiments of the invention.

During transient simulation, the circuit simulation unit 460 may use the flow chart 600 illustrated in FIG. 6 for memory-circuit device groups. The flow chart 600 starts at block 602. In operation 605, the circuit simulation unit 460 determines whether an instance of a memory-circuit device group is word-line-driven. For a word-line-driven device group, the circuit simulation unit 460 determines, in operation 615, whether instances of the word-line-driven device groups are activated. An instance of a word-line-driven device group is activated if at least one input port of the instance is activated. An activated/inactivated port of a word-line-driven device group is usually coupled to a word line.

With various implementations of the invention, the circuit simulation unit 460 may check the voltage of an activated/inactivated port of a word-line-driven device group against a threshold voltage to determine whether the port is activated or not. The threshold voltage may be determined by the corresponding bit line current. If the bit line current of a memory cell is less than a threshold (e.g., 1.0 pico amp), the memory cell is treated as in an inactivated state.

For an inactivated instance of a word-line-driven device group, the circuit simulation unit 460 associates inactivated device model values for the word-line-driven device group with the inactivated instance in operation 620. As noted above, the inactivated device model values are often obtained and stored at the initialization stage (t=0). It should be appreciated the term "associating" is a high-level abstraction of the actual operation that is performed. The actual operation that corresponds to the term may vary depending on the particular implementation and is readily discernible by one of ordinary skill in the art. For example, associating inactivated device model values for the word-line-driven device group with the inactivated instance may mean linking the inactivated device model values and the inactivated instance with a pointer, loading the inactivated device model values for the inactivated instance for subsequent computations, or both thereof.

For an activated instance of a word-line-driven device group, the circuit simulation unit 460 determines, in operation 625, whether device model values exist for the word-line-driven device group at a voltage state associated with the activated instance. If such device model values exist, the circuit simulation unit 460 associates them with the activated instance in operation 630. Otherwise, the circuit simulation unit 460 computes the device model values in operation 640, associates the computed device model values with the activated instance in operation 650, and stores the computed device model values for the word-line-driven device group at the voltage state in operation 660.

If the word-line-driven device group includes another word-line-driven device group (child word-line-driven device group), during the computation of device model values, the circuit simulation unit 460 may determine whether one or more activated input ports of the activated instance of the word-line-driven device group are coupled to one or more input ports of an instance of the child word-line-driven device group. If coupled, the circuit simulation unit 460 may follow operations 625-660 of the flow chart 600 to derive device model values for the instance of the child word-line-driven device group.

If the instance is determined in operation 605 to be not word-line-driven, the circuit simulation unit 460 may skip operations 615 and 620 and performs the rest operations in the flow chart.

In some embodiments of the invention, the circuit simulation unit 460 may reduce memory overhead by removing previously-stored device model values for a memory-circuit device group at a set of voltage states except those for the last state when instances of the memory-circuit device group are determined to have reached a steady state.

Lastly, in operation 560, the circuit simulation tool 400 outputs simulation results. For example, the simulation results may be stored in one or more computer-readable storage media (e.g., volatile or nonvolatile memory or storage), as shown with the output database 485 in FIG. 4.

To exploit the repetitive nature of memory-circuit device groups and the operating pattern for word-line-driven device groups, the disclosed technology may compute and store only one set of device model values corresponding to a set of voltage states for all instances of the same memory-circuit device group, and use status of input ports of a word-line-driven device group as the initial check for deciding whether computation of device model values is necessary. An inactivated word-line-driven device group can be greatly simplified by an equivalent circuit. A large portion of a circuit under simulation remains latent because only a very small number of the word-line-driven device groups in the circuit may be activated at any given time. The disclosed technology can accelerate the simulation and reduce the memory requirement.

Conclusion

Having illustrated and described the principles of the disclosed technology, it will be apparent to those skilled in the art that the disclosed embodiments can be modified in arrangement and detail without departing from such principles. In view of the many possible embodiments to which the principles of the disclosed technologies can be applied, it should be recognized that the illustrated embodiments are only preferred examples of the technologies and should not be taken as limiting the scope of the invention. Rather, the scope of the invention is defined by the following claims and their equivalents. We therefore claim as our invention all that comes within the scope and spirit of these claims.

What is claimed is:

1. One or more non-transitory computer-readable media storing computer-executable instructions for causing one or more processors to perform a method, the method comprising:

receiving information of a circuit design;

analyzing the circuit design to derive information of memory-circuit device groups, each of the memory-circuit device groups having at least two instances in the circuit design, the memory-circuit device groups comprising word-line-driven device groups;

if the circuit design is hierarchically structured, flattening the circuit design while keeping instances of the memory-circuit device groups intact;

partitioning the circuit design into a plurality of subcircuits; and simulating the circuit design based on the plurality of subcircuits, wherein the simulating comprises:

determining whether instances of the word-line-driven device groups are activated, an instance of a word-line-driven device group being activated if at least one input port of the instance is activated;

associating, for an inactivated instance of a word-line-driven device group, inactivated device model values for the word-line-driven device group with the inactivated instance;

determining, for an activated instance of a word-line-driven device group, whether activated device model values exist for the word-line-driven device group at a voltage state associated with the activated instance;

if the activated device model values exist for the word-line-driven device group at the voltage state, associating the activated device model values with the activated instance; and if the activated device model values do not exist for the word-line-driven device group at the voltage state, computing the activated device model values, associating the computed activated device model values with the activated instance, and storing the computed activated device model values for the word-line-driven device group at the voltage state.

2. The one or more non-transitory computer-readable media recited in claim 1, wherein a memory-circuit device group in the memory-circuit device groups includes one or more instances of another memory-circuit device group in the memory-circuit device groups.

3. The one or more non-transitory computer-readable media recited in claim 2, wherein the computing comprises:

determining whether one or more activated input ports of the activated instance are coupled to one or more input ports of an instance of the another memory-circuit device group;

if coupled, determining, for the instance of the another memory-circuit device group, whether device model values exist for the another memory-circuit device group at a voltage state associated with the instance of the another memory-circuit device group;

if the device model values exist for the another memory-circuit device group at the voltage state, associating the device model values with the instance of the another memory-circuit device group; and if the device model values do not exist for the another memory-circuit device group at the voltage state, computing the device model values, associating the computed device model values with the instance of the another memory-circuit device group, and storing the computed device model values for the another memory-circuit device group at the voltage state.

4. The one or more non-transitory computer-readable media recited in claim 1, wherein the word-line-driven device groups comprise memory cell groups.

5. The one or more non-transitory computer-readable media recited in claim 1, wherein the memory-circuit device groups further comprise sense amplifier device groups.

6. The one or more non-transitory computer-readable media recited in claim 1, wherein the simulating further comprises:

determining, for an instance of a memory-circuit device group that is not word-line driven, whether device model values exist for the memory-circuit device group at a voltage state associated with the instance;

if the device model values exist for the memory-circuit device group at the voltage state, associating the device model values with the instance; and if the device model values do not exist for the memory-circuit device group at the voltage state, computing the device model values; associating the computed device model values with the instance; and storing the computed device model values for the memory-circuit device group at the voltage state.

7. The one or more non-transitory computer-readable media recited in claim 1, wherein the partitioning is based at least in part on port information for devices and device groups, the port information comprising information whether a port for a device or a memory-circuit device group is an input port or an bi-directional port.

8. The one or more non-transitory computer-readable media recited in claim 1, wherein the simulating further comprises:
removing previously-stored device model values for a memory-circuit device group at a set of voltage states except those for the last state when instances of the memory-circuit device group are determined to have reached a steady state.

9. A method, comprising:
with a computer,
receiving information of a circuit design;
analyzing the circuit design to derive information of memory-circuit device groups, each of the memory-circuit device groups having at least two instances in the circuit design, the memory-circuit device groups comprising word-line-driven device groups;
if the circuit design is hierarchically structured, flattening the circuit design while keeping instances of the memory-circuit device groups intact;
partitioning the circuit design into a plurality of subcircuits; and
simulating the circuit design based on the plurality of subcircuits, wherein the simulating comprises:
determining whether instances of the word-line-driven device groups are activated, an instance of a word-line-driven device group being activated if at least one input port of the instance is activated;
associating, for an inactivated instance of a word-line-driven device group, inactivated device model values for the word-line-driven device group with the inactivated instance;
determining, for an activated instance of a word-line-driven device group, whether activated device model values exist for the word-line-driven device group at a voltage state associated with the activated instance;
if the activated device model values exist for the word-line-driven device group at the voltage state, associating the activated device model values with the activated instance; and
if the activated device model values do not exist for the word-line-driven device group at the voltage state, computing the activated device model values, associating the computed activated device model values with the activated instance, and storing the computed activated device model values for the word-line-driven device group at the voltage state.

10. The method recited in claim 9, wherein a memory-circuit device group in the memory-circuit device groups includes one or more instances of another memory-circuit device group in the memory-circuit device groups.

11. The method recited in claim 10, wherein the computing comprises:
determining whether one or more activated input ports of the activated instance are coupled to one or more input ports of an instance of the another memory-circuit device group;
if coupled, determining, for the instance of the another memory-circuit device group, whether device model values exist for the another memory-circuit device group at a voltage state associated with the instance of the another memory-circuit device group;
if the device model values exist for the another memory-circuit device group at the voltage state, associating the device model values with the instance of the another memory-circuit device group; and
if the device model values do not exist for the another memory-circuit device group at the voltage state, computing the device model values, associating the computed device model values with the instance of the another memory-circuit device group, and storing the computed device model values for the another memory-circuit device group at the voltage state.

12. The method recited in claim 9, wherein the word-line-driven device groups comprise memory cell groups.

13. The method recited in claim 9, wherein the memory-circuit device groups further comprise sense amplifier device groups.

14. The method recited in claim 9, wherein the simulating further comprises:
determining, for an instance of a memory-circuit device group that is not word-line driven, whether device model values exist for the memory-circuit device group at a voltage state associated with the instance;
if the device model values exist for the memory-circuit device group at the voltage state, associating the device model values with the instance; and
if the device model values do not exist for the memory-circuit device group at the voltage state, computing the device model values; associating the computed device model values with the instance; and storing the computed device model values for the memory-circuit device group at the voltage state.

15. The method recited in claim 9, wherein the partitioning is based at least in part on port information for devices and device groups, the port information comprising information whether a port for a device or a memory-circuit device group is an input port or an bi-directional port.

16. The method recited in claim 9, wherein the simulating further comprises:
removing previously-stored device model values for a memory-circuit device group at a set of voltage states except those for the last state when instances of the memory-circuit device group are determined to have reached a steady state.

17. A system comprising:
one or more processors, the one or more processors programmed to perform a method, the method comprising:
receiving information of a circuit design;
analyzing the circuit design to derive information of memory-circuit device groups, each of the memory-circuit device groups having at least two instances in the circuit design, the memory-circuit device groups comprising word-line-driven device groups;
if the circuit design is hierarchically structured, flattening the circuit design while keeping instances of the memory-circuit device groups intact;
partitioning the circuit design into a plurality of subcircuits; and
simulating the circuit design based on the plurality of subcircuits, wherein the simulating comprises:
determining whether instances of the word-line-driven device groups are activated, an instance of a word-line-driven device group being activated if at least one input port of the instance is activated;

associating, for an inactivated instance of a word-line-driven device group, inactivated device model values for the word-line-driven device group with the inactivated instance;

determining, for an activated instance of a word-line-driven device group, whether activated device model values exist for the word-line-driven device group at a voltage state associated with the activated instance;

if the activated device model values exist for the word-line-driven device group at the voltage state, associating the activated device model values with the activated instance; and if the activated device model values do not exist for the word-line-driven device group at the voltage state, computing the activated device model values, associating the computed activated device model values with the activated instance, and storing the computed activated device model values for the word-line-driven device group at the voltage state.

18. The system recited in claim 17, wherein a memory-circuit device group in the memory-circuit device groups includes one or more instances of another memory-circuit device group in the memory-circuit device groups.

19. The method recited in claim 18, wherein the computing comprises:

determining whether one or more activated input ports of the activated instance are coupled to one or more input ports of an instance of the another memory-circuit device group;

if coupled, determining, for the instance of the another memory-circuit device group, whether device model values exist for the another memory-circuit device group at a voltage state associated with the instance of the another memory-circuit device group;

if the device model values exist for the another memory-circuit device group at the voltage state, associating the device model values with the instance of the another memory-circuit device group; and if the device model values do not exist for the another memory-circuit device group at the voltage state, computing the device model values, associating the computed device model values with the instance of the another memory-circuit device group, and storing the computed device model values for the another memory-circuit device group at the voltage state.

20. The method recited in claim 17, wherein the simulating further comprises:

determining, for an instance of a memory-circuit device group that is not word-line driven, whether device model values exist for the memory-circuit device group at a voltage state associated with the instance;

if the device model values exist for the memory-circuit device group at the voltage state, associating the device model values with the instance; and if the device model values do not exist for the memory-circuit device group at the voltage state, computing the device model values; associating the computed device model values with the instance; and storing the computed device model values for the memory-circuit device group at the voltage state.

* * * * *